United States Patent
Arbogast et al.

(10) Patent No.: US 6,682,110 B1
(45) Date of Patent: Jan. 27, 2004

(54) LATCH ASSEMBLY

(75) Inventors: Porter Rodgers Arbogast, Fort Collins, CO (US); Arlen L. Roesner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/210,001

(22) Filed: Jul. 31, 2002

(51) Int. Cl.$^7$ ............................................... E05B 15/02
(52) U.S. Cl. .................... 292/341.15; 292/218
(58) Field of Search ................. 292/341.15, 341.17, 292/304, 218, 302; 24/649

(56) References Cited

U.S. PATENT DOCUMENTS

| | | | | |
|---|---|---|---|---|
| 232,789 A | * | 9/1880 | Walker | |
| 493,559 A | * | 3/1893 | Pfenning | |
| 507,927 A | * | 10/1893 | Pfenning | |
| 2,647,294 A | * | 8/1953 | Davis | 24/223 |
| 3,207,543 A | * | 9/1965 | Boyer | 292/52 |
| 3,740,703 A | * | 6/1973 | Sessions | 339/228 |
| 4,320,885 A | * | 3/1982 | Kawazoe | 248/222.1 |
| 4,474,492 A | * | 10/1984 | Fleitas | 403/322 |
| 4,557,511 A | * | 12/1985 | Cohn et al. | 292/218 |

* cited by examiner

*Primary Examiner*—Gary Estremsky
(74) *Attorney, Agent, or Firm*—Kevin M. Hart

(57) ABSTRACT

A latch assembly is operable to catch automatically and is releasable by hand. A component frame defines a clearance hole and a stop. A latch, also with a clearance hole, is mounted to the frame so that the clearance holes overlap. The latch is biased against the stop but is capable of pivoting away from the stop responsive to hand-applied pressure. A peg having a groove underneath a sloping top is mounted to a chassis or other surface against which the component frame is to be retained. As the component frame is lowered over the peg, an edge of the latch contacts the top of the peg, causing the latch to pivot so that the frame may be lowered into place. When the frame is in place, the latch pivots back and snaps into the groove.

9 Claims, 7 Drawing Sheets

LATCH ASSEMBLY

FIELD OF THE INVENTION

This invention relates generally to latches or clasps, and more particularly to a hand-releasable latch assembly for retaining the frame of a component against a surface such as a computer chassis.

BACKGROUND

Computer and other electronic chassis are becoming smaller, and their contents are becoming commensurately more dense. Fasteners for removably retaining components within such enclosures must therefore fit within small spaces and should preferably present a low profile. Ideally, such fasteners should be easy to apply and operate both in manufacturing and in maintenance environments.

SUMMARY OF THE INVENTION

A latch assembly according to the invention is operable to catch automatically, is releasable by hand, and may be beneficially employed (for example) to releasably retain computer components inside a computer chassis.

In one embodiment, a component frame defines a clearance hole and a stop. A latch also defines a clearance hole, and is mounted to the component frame so that the two clearance holes overlap. The latch is biased toward the stop but is capable of pivoting away from the stop responsive to hand-applied pressure. A peg is mounted to a chassis or other surface against which the component frame is to be retained. The peg includes a groove underneath a sloping top. As the clearance hole of the component frame is lowered orthogonally over the peg, an edge of the latch clearance hole comes into contact with the sloping top of the peg. The sloping top of the peg causes the latch to pivot a sufficient distance to allow the component frame to be lowered into place. When the component frame reaches its retained position, the latch pivots back again and snaps into the groove of the peg, thus retaining the component frame against the chassis. For removal, hand-applied pressure against the latch is sufficient to cause the latch to pivot back out of the groove of the peg. The component frame may then be lifted off of the peg and away from its retained position.

DETAILED DESCRIPTION OF THE PREFERRED EMBODIMENTS

Figure 1:
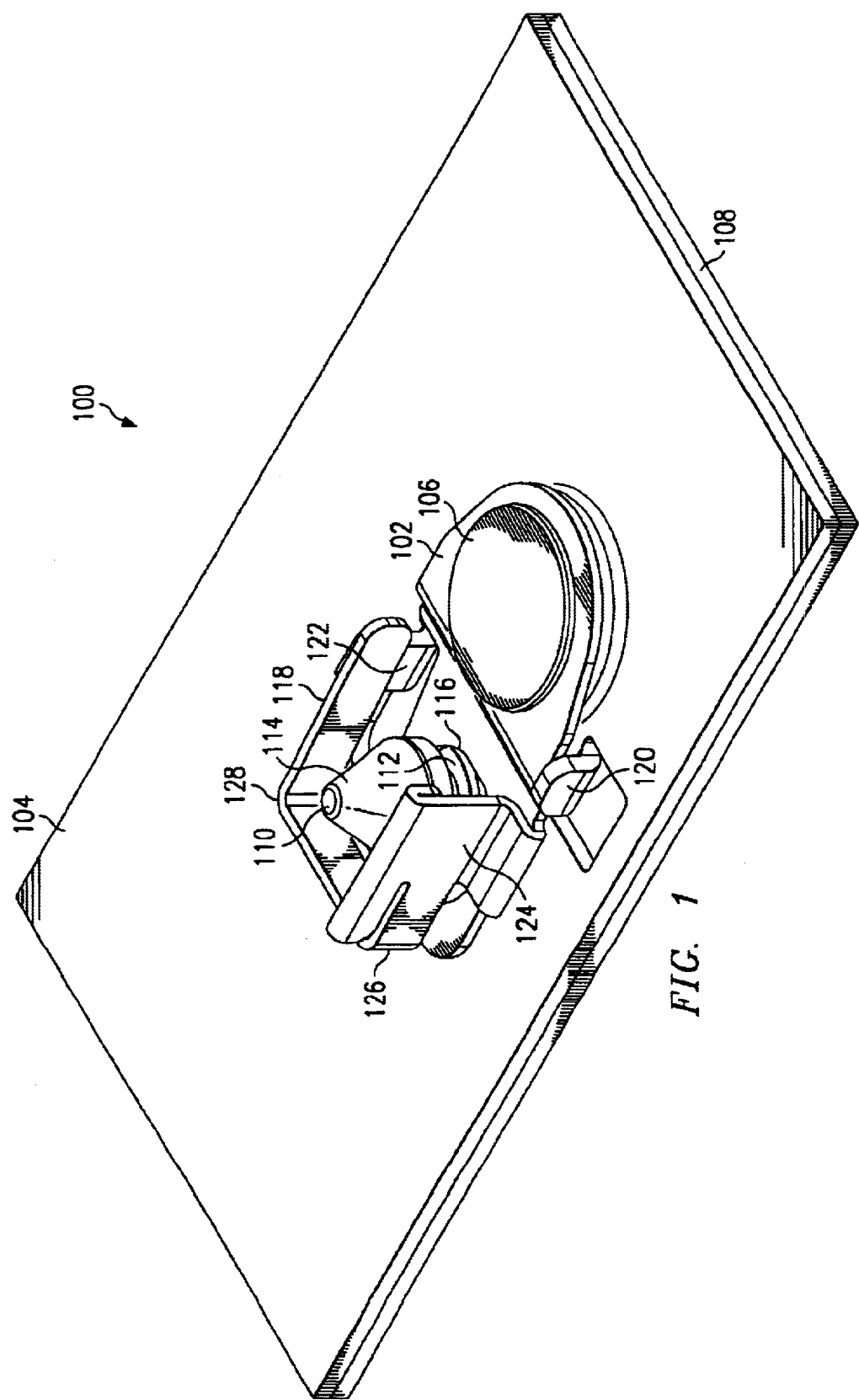
FIG. 1 is an oblique view of a latch assembly retaining a component frame against a chassis according to a preferred embodiment of the invention.
Figure 2:
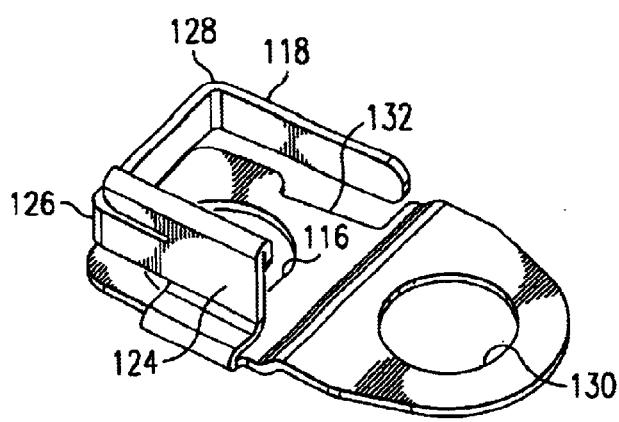
FIG. 2 is an oblique view of a pivoting latch of the latch assembly of FIG. 1.
Figure 3:
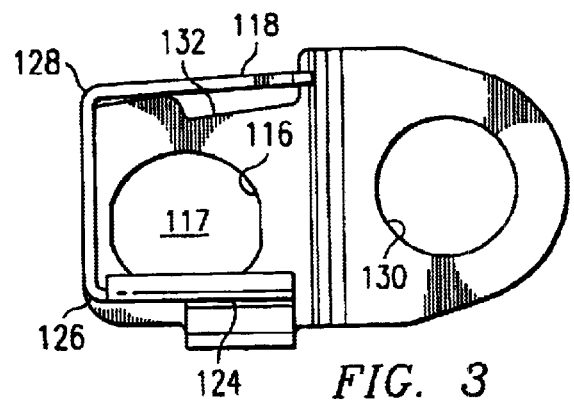
FIG. 3 is a top view of the pivoting latch of FIG. 2.
Figure 4:
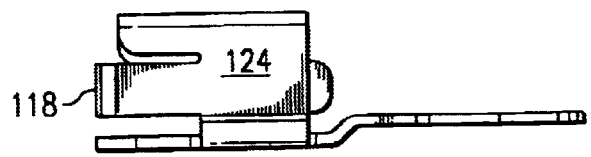
FIG. 4 is a first side view of the pivoting latch of FIG. 2.
Figure 5:
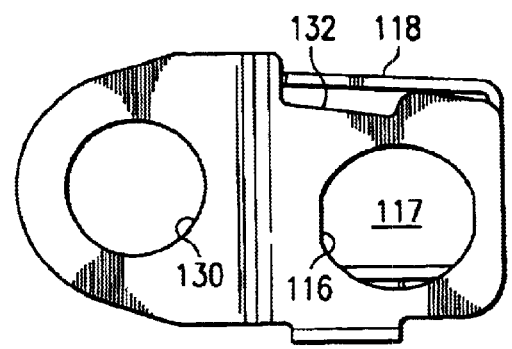
FIG. 5 is a bottom view of the pivoting latch of FIG. 2.
Figure 6:
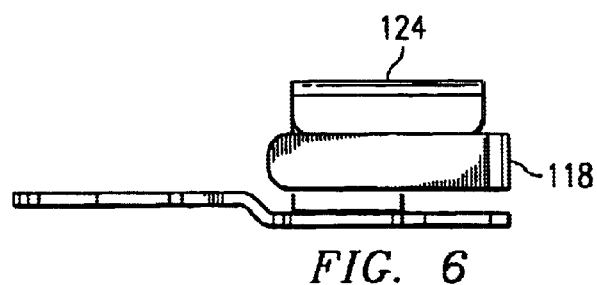
FIG. 6 is a second side view of the pivoting latch of FIG. 2.

FIG. 1 illustrates a latch assembly 100 according to a preferred embodiment of the invention. Latch assembly 100 includes a latch 102 secured to a component frame 104. In the embodiment shown, latch 102 is secured to frame 104 by a pivot pin 106. In other embodiments, other techniques may be used to pivotingly secure latch 102 to component frame 104. Component frame 104 is shown in a retained position against a surface 108 such as a chassis. Latch assembly 100 also includes a peg 110 having a sloping top 114 and a groove 112. Peg 110 is secured to surface 108. Latch 102 includes a resilient elongate member 118 that serves to urge latch 102 away from stop 122 formed in component frame 104 and toward stop 120, also formed in component frame 104. Component frame 104 is retained against surface 108 by virtue of the fact that an edge 116 of a clearance hole formed in latch 102 is held inside groove 112 of peg 110.

FIGS. 2–6 illustrate latch 102 in more detail. In one embodiment, latch 102 may be formed as shown using one integral piece of half-hard steel. In other embodiments latch 102 could be formed from alternative materials such as, for example, quarter-hard steel or plastic. A hole 130 may be provided in latch 102 to accommodate pivot pin 106. A finger tab 124 may be provided to facilitate the release of latch 102 with the application of pressure by hand (to be discussed in more detail below in relation to FIGS. 13–16). Resilient elongate member 118 may include two bends 126, 128, each of the bends approximately 90 degrees, so that elongate member 118 forms three sides of a substantially rectangular or square shape. Although in other embodiments various other means such as springs may be used to bias latch 102 toward stop 120, the inventors have determined that the use of a rectangle-shaped elongate member such as that shown in the drawing contributes to compactness, yields an appropriate strength of bias (to be discussed in more detail below in relation to FIGS. 13–16), and does so in a cost-effective manner. Cut-out area 132 may be provided so that latch 102 clears stop 122 when pivoting away from stop 120.

Figure 7:
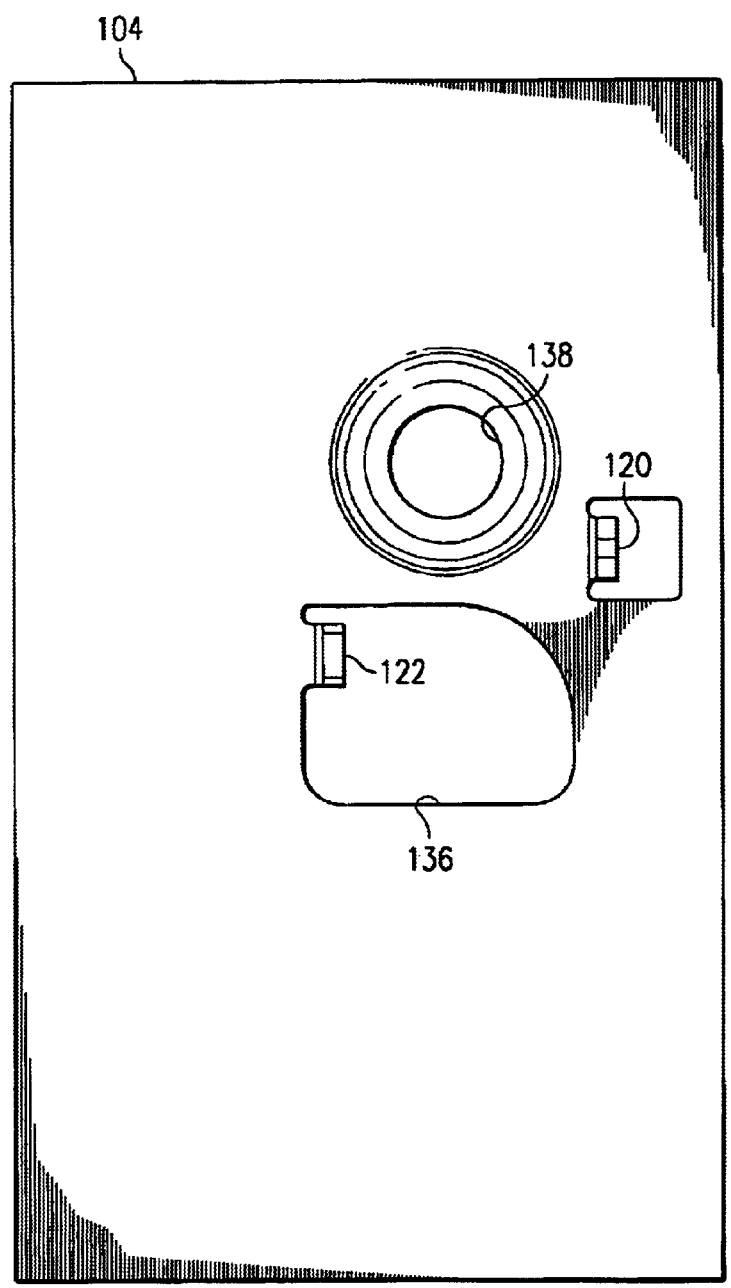
FIG. 7 is a top view of a component frame adapted to receive the pivoting latch of FIG. 2 according to a preferred embodiment of the invention.
Figure 8:
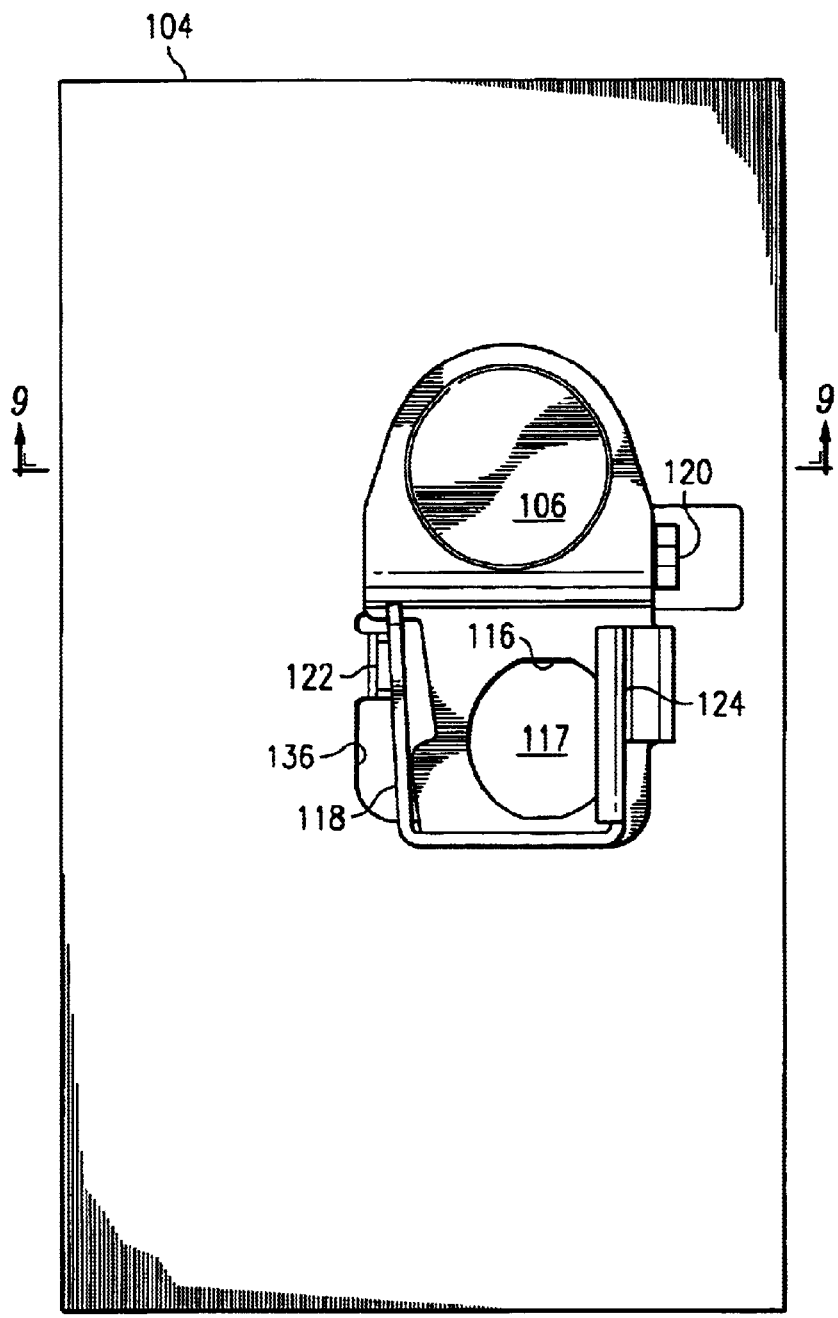
FIG. 8 is a top view of the latch of FIG. 2 having been assembled to the component frame of FIG. 7 according to a preferred embodiment of the invention.
Figure 9:
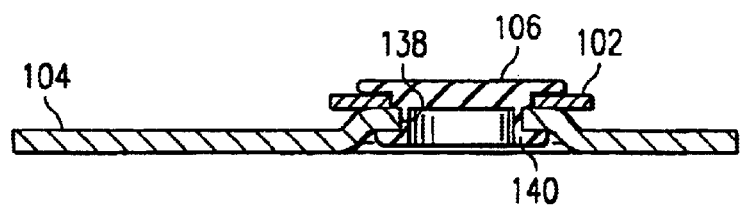
FIG. 9 is the sectional view A—A indicated in FIG. 8.

FIGS. 7–9 illustrate component frame 104 in more detail, as well as a method for attaching latch 102 thereto. In the embodiment shown, a clearance hole 136 is provided in component frame 104 for clearing peg 110 when frame 104 is lowered over peg 110 and lifted off of peg 110. Stops 120 and 122 may be formed on opposite sides of hole 136 by any suitable means, such as by bending a portion of the sheet metal from which component frame 104 is formed. Latch 102 is positioned over component frame 104 between stops 120, 122 so that clearance holes 117 and 136 overlap. One end of elongate member 118 contacts stop 122, and the other end of elongate member 118 may terminate, for example, at finger tab 124. Hole 138 is provided adjacent to hole 136 and accommodates pivot pin 106. Hole 138 may be raised slightly (as shown) so that swage 140 does not extend below the plane of frame 104.

Figure 10:
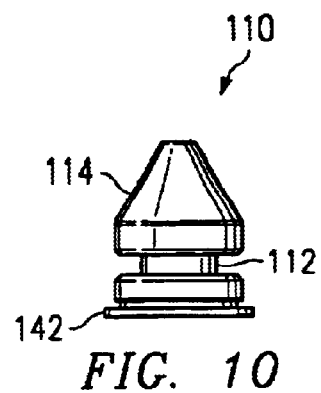
FIG. 10 is a side view of a grooved peg of the latch assembly of FIG. 1.
Figure 11:
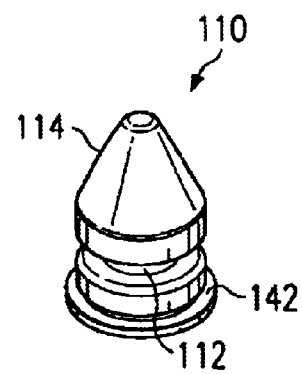
FIG. 11 is an oblique view of the grooved peg of FIG. 10.
Figure 12:
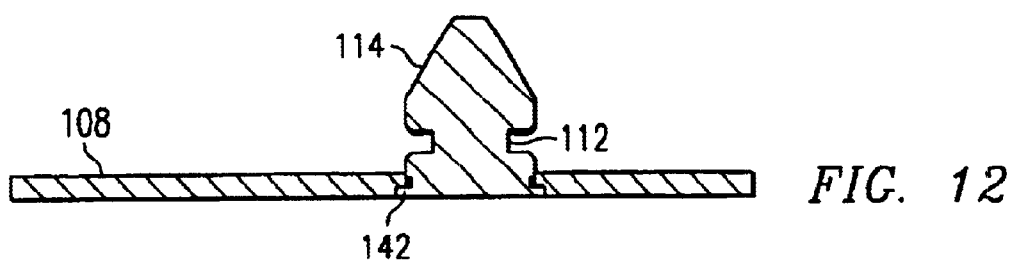
FIG. 12 is a sectional view of the grooved peg of FIG. 10 having been assembled to the chassis of FIG. 1.

FIGS. 10–12 illustrate peg 110 in more detail. In the embodiment shown, sloping top 114 of peg 110 has a conical shape. In other embodiments, the slope may be provided by an alternative sloping or slanted profile and need not be symmetrical. Groove 112 is provided underneath sloping top 114, and should be sized large enough to receive edge 116 of hole 117 without binding. The illustrated peg is attached to surface 108 by a snap fit between grooved rim 142 and a corresponding hole formed in surface 108. Other suitable means may be employed for attaching peg 110 to surface 108.

Figure 14:
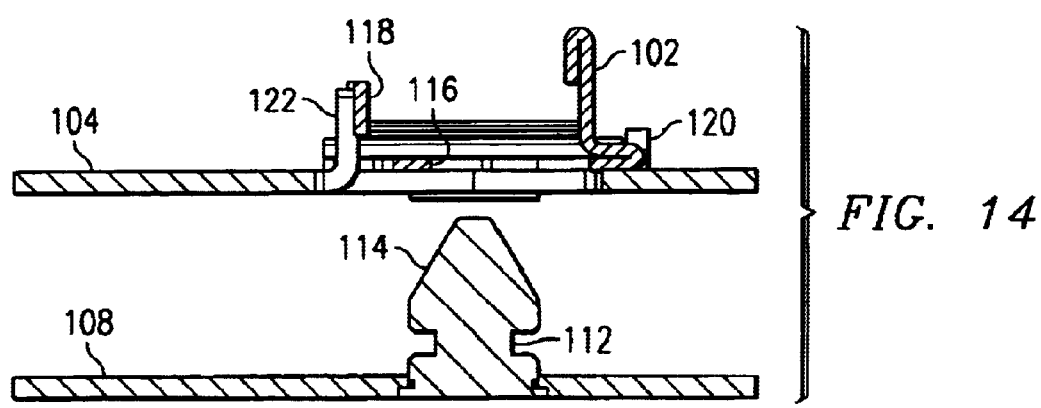
FIG. 14 is the sectional view B—B indicated in FIG. 13.
Figure 13:
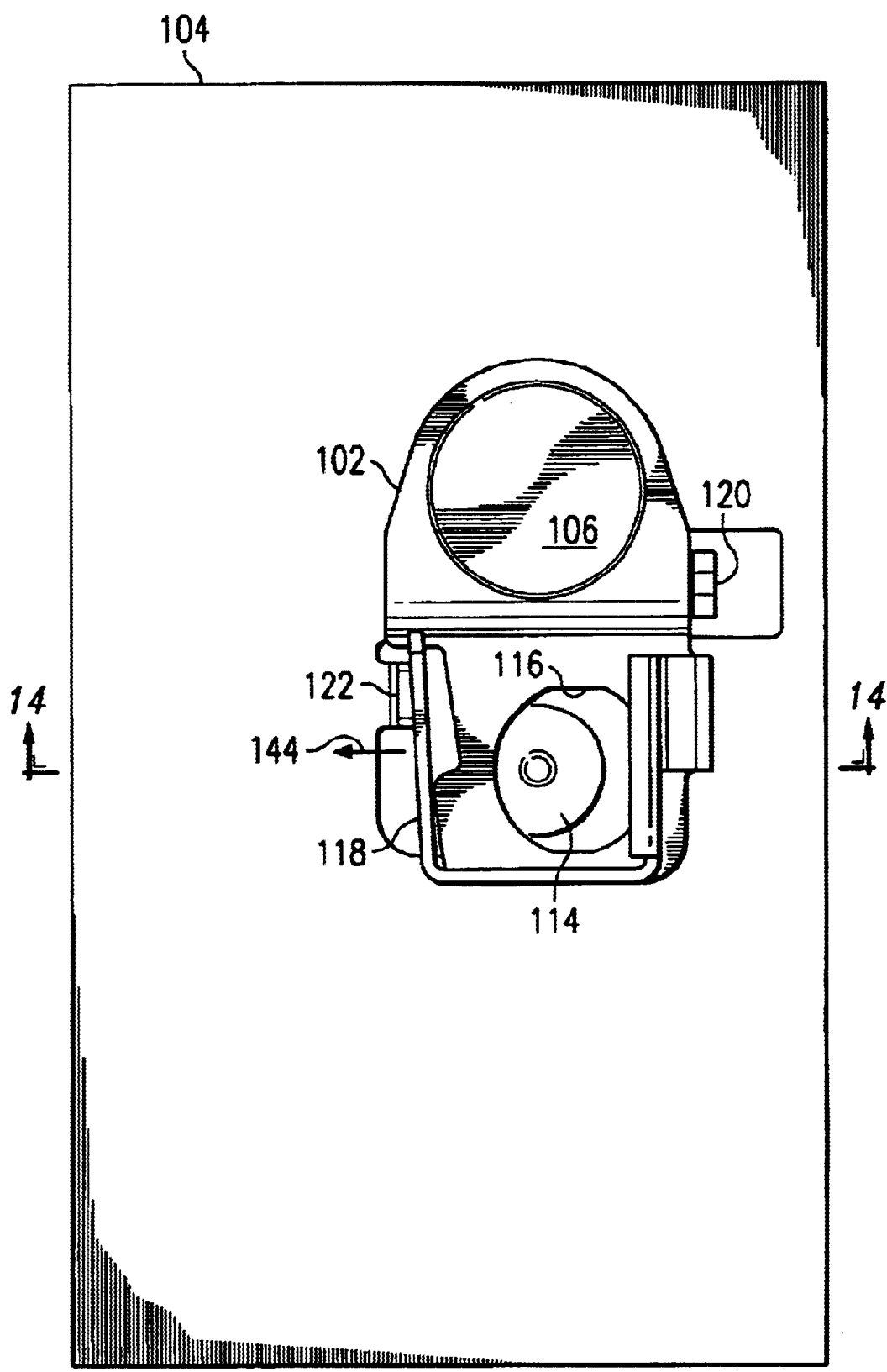
FIG. 13 is a top view of the component frame of FIG. 1 suspended over the chassis of FIG. 1.
Figure 15:
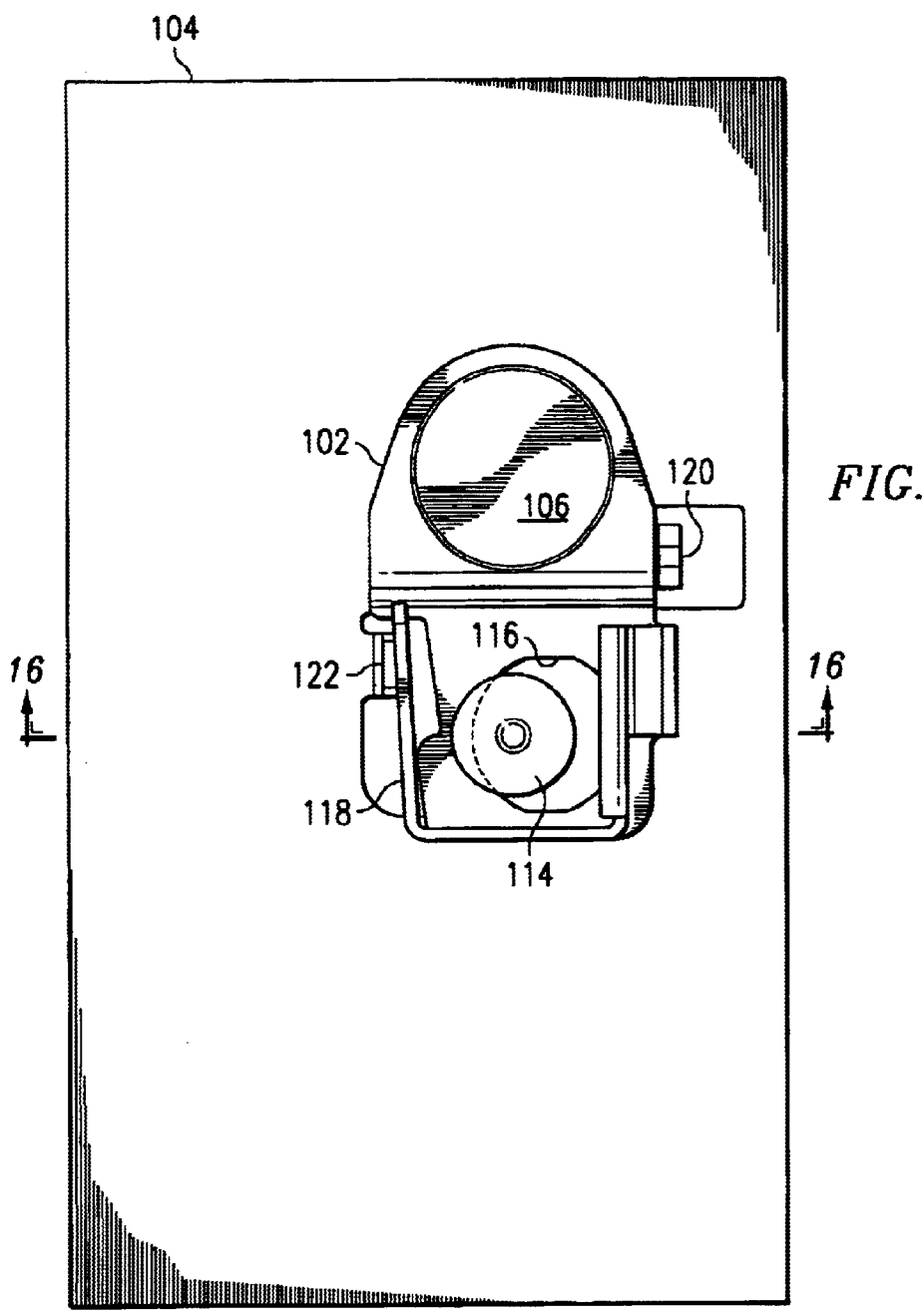
FIG. 15 is a top view of the component frame of FIG. 1 having been secured to the chassis of FIG. 1.
Figure 16:
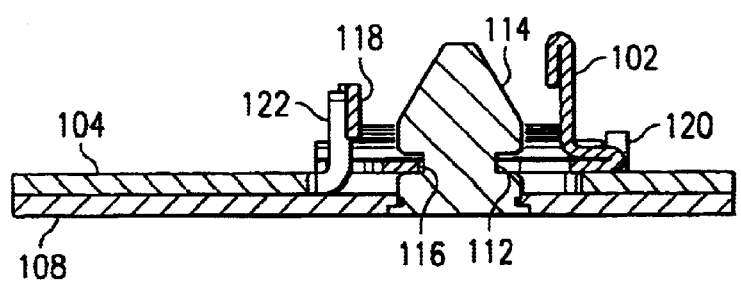
FIG. 16 is the sectional view C—C indicated in FIG. 15.

FIGS. 13–16 illustrate a preferred method for using latch assembly 100 to secure component frame 104 against surface 108. Namely, component frame 104 is lowered orthogonally down over peg 110 as shown in FIGS. 13–14. As frame 104 is lowered, edge 116 of hole 117 comes into contact with sloping top 114 of peg 110. The bias provided by elongate member 118 is sufficiently elastic to allow latch 102 to pivot away from stop 120 in direction 142 responsive to the contact between edge 116 and the sloping top 114 of peg 110. This movement allows frame 104 to be lowered into the retained position shown in FIGS. 15–16. In the retained position, edge 116 of hole 117 snaps into groove 112 of peg 110, thus retaining frame 104 against surface 108. The bias provided by elongate member 118 is sufficiently strong to retain edge 116 of clearance hole 117 inside groove 112 of peg 110 when component frame 104 is in the retained position, but is sufficiently elastic to allow edge 116 to be moved out of groove 112 responsive to pressure applied by hand to the latch (for example, by pushing against finger tab 124). Thus, to remove frame 104 from surface 108, pressure may be applied to latch 102 in direction 142, and frame 104 may be lifted orthogonally away from surface 108 off of peg 110.

While the invention has been described in detail with reference to preferred embodiments thereof, the described embodiments have been presented by way of example and not by way of limitation. It will be understood by those skilled in the art that various changes may be made in the form and details of the described embodiments without deviating from the spirit and scope of the invention as defined by the following claims.

We claim:

1. A latch assembly, comprising:
   a frame defining a first planar clearance hole and having first and second stops protruding on one side of the plane of the first clearance hole; and
   a latch defining a second clearance hole and pivotingly mounted to the frame between the first and second stops such that the first and second clearance holes overlap; and
   a resilient elongate member, having first and second ends, extending around part of the second clearance hole such that the first and second ends are disposed on opposite sides of the second clearance hole, the second end in contact with the second stop and biasing the latch toward the first stop, and the member secured to the latch only at the first end.

2. The latch assembly of claim 1, further comprising:
   a peg for attachment to a surface against which the frame is to be retained, the peg having a sloping top with a groove thereunder, and sized to fit through the first and second clearance holes.

3. The latch assembly of claim 2:
   wherein the bias is sufficiently elastic o allow the latch to pivot away from the first stop responsive to contact between an edge of the second clearance hole and the sloping top of the peg as the frame is lowered orthogonally over the peg, but sufficiently strong to retain the edge of the second clearance hole inside the groove of the peg when the frame is in a retained position.

4. The latch assembly of claim 2, wherein:
   the bias is also sufficiently elastic to allow the edge of the second clearance hole to be moved out of the groove of the peg responsive to pressure applied by hand to the latch.

5. The latch assembly of claim 1:
   wherein the resilient elongate member comprises two approximately 90-degree bends between the first and second ends such that the resilient elongate member forms three sides of a substantially rectangular or square shape.

6. The latch assembly of claim 1, wherein:
   the latch comprises a finger tab extending orthogonally upward from the latch, and the first end of the resilient elongate member terminates at the finger tab.

7. The latch assembly of claim 1, wherein:
   the latch and the resilient elongate member comprise a unitary piece of bent half-hard steel.

8. The latch assembly of claim 1, wherein:
   the sloping top of the peg comprises a conical shape.

9. The latch assembly of claim 1, wherein:
   the frame defines a pivot pin hole adjacent to the first clearance hole for receiving a pivot pin that secures the latch against the frame.

* * * * *